No. 866,765.  
PATENTED SEPT. 24, 1907.  
S. C. ANKER-HOLTH.  
CLUTCH.  
APPLICATION FILED SEPT. 4, 1906.
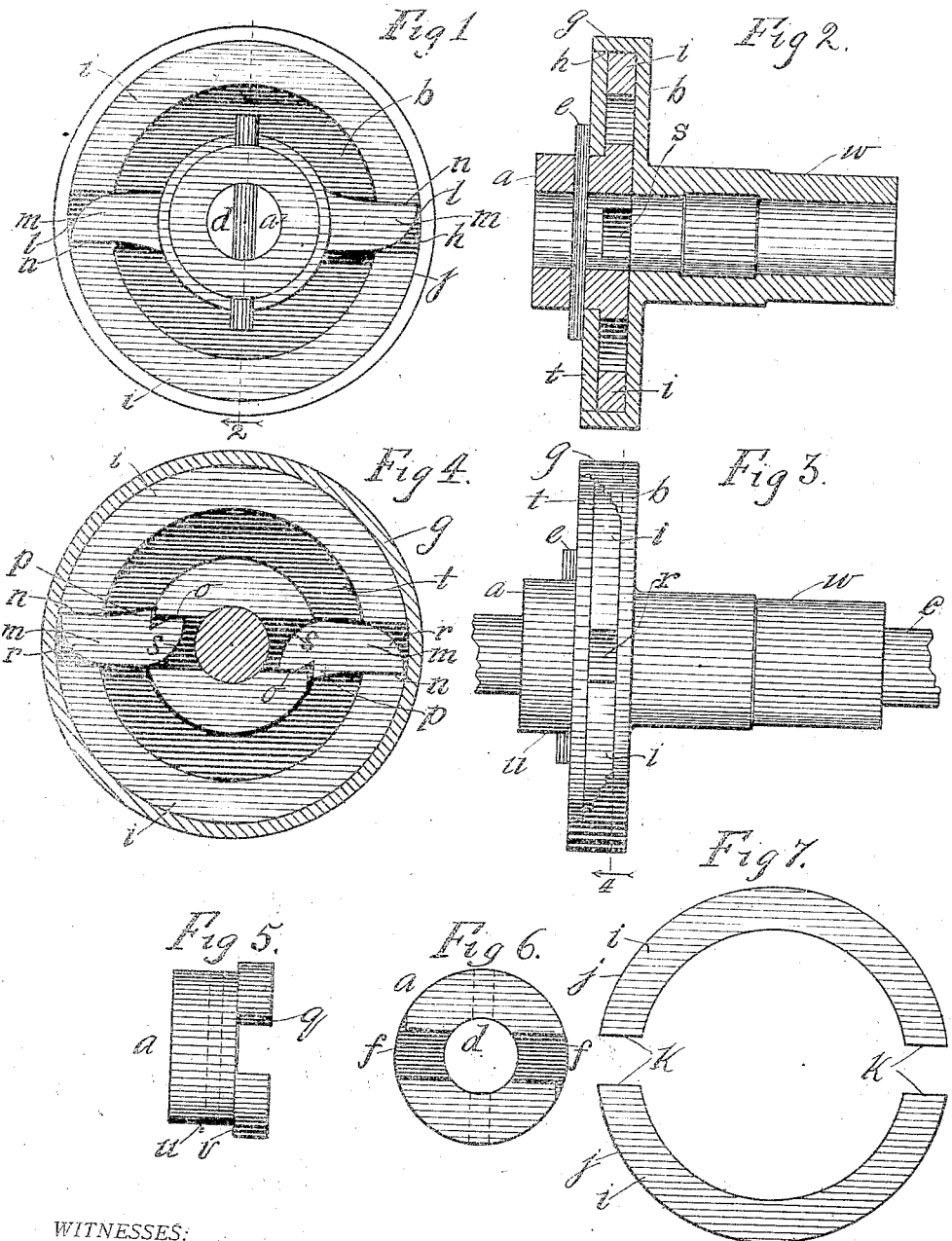
WITNESSES:  
INVENTOR.  
Severin C. Anker-Holth  
BY Harry Irwin Cromer  
ATTORNEY.

UNITED STATES PATENT OFFICE.

SEVERIN C. ANKER-HOLTH, OF RIVERSIDE, ILLINOIS.

CLUTCH.

No. 866,765.　　　　Specification of Letters Patent.　　　Patented Sept. 24, 1907.

Application filed September 4, 1906. Serial No. 333,188.

*To all whom it may concern:*

Be it known that I, SEVERIN C. ANKER-HOLTH, a citizen of the United States, residing in Riverside, in the county of Cook and State of Illinois, have invented certain new and useful Improvements in Clutches, of which the following is a specification.

This invention relates to that class of clutches known as friction clutches.

The principal object of the invention is to provide a simple, economical and efficient clutch.

A further object is to provide a properly balanced friction clutch, the members of which are adapted to be connected as firmly and rigidly as possible when they are to be rotated together, and having friction members adapted to be instantly completely released or disengaged so as to permit the instant free and unretarded rotation thereof with relation to each other when required.

Other and further objects of the invention will appear from examination of the drawings and the following description and claims.

In the accompanying drawings Figure 1 is an end view in elevation of a clutch constructed in accordance with my improvements, with the retaining disk or washer shown in Fig. 2 removed. Fig. 2 a central sectional view in elevation; Fig. 3 a view in side elevation with a portion of the outer clutch member broken away; Fig. 4 a view in transverse sectional elevation taken on line 4 of Fig. 3 looking in the direction of the arrow; Fig. 5 a detail view in side elevation of the inner clutch member. Fig. 6 a detail view, showing the inner face of the inner clutch member and Fig. 7 a detail view of the intermediate connecting or friction mechanism.

In constructing the clutch in accordance with my improvements I provide an inner member $a$, and an outer clutch member $b$, which are mounted upon a shaft $c$, one of such clutch members, preferably the inner member $a$, being secured to the shaft so as to rotate therewith and the other clutch member being rotatable with relation to the connected clutch member and shaft when the clutch mechanism is in releasing position. The inner clutch member is preferably annular in form and is provided with an axial perforation $d$ through which the shaft extends, being secured in fixed relation to the shaft by means of a cotter pin $e$, or in any ordinary and well known manner. This inner clutch member is provided with a slot or slots $f$, extending laterally thereof, preferably diametrically on opposite sides of the axial center and cut into the inner face of such clutch member, as shown in Figs. 5 and 6. The outer clutch member $b$ is provided with an annular flange or rim $g$, the inner annular surface $h$ of which forms a friction surface which is adapted to be engaged by the outer annular surface portions $j$ of intermediate connecting or friction mechanism comprising friction members or shoes $i$. These intermediate friction members or shoes have circular outer friction surface portions and are mounted on opposite sides of the inner clutch member and between it and the annular flanged portion of the outer clutch member. Being separate and mounted as described, the shoes are movable diametrically in opposite directions outward laterally into binding frictional engagement with the inner peripheral face of the outer clutch member and are adapted to be instantly released by moving directly inward toward the axial center of the clutch and toward each other. They are of equal weight and the clutch is thus well balanced at all times whether in locked or releasing position. The opposite ends $k$ of these intermediate friction members or shoes are mounted a sufficient distance apart so as to provide spaces $l$ therebetween adapted to admit levers for engaging the inner clutch member and for pressing the shoes into binding frictional engagement with the outer clutch member and also for releasing and rotating the shoes or friction mechanism with relation to the outer clutch member when in releasing position.

Lever mechanism for accomplishing the purposes suggested is provided in the form of a pair of laterally extending levers or dogs $m$, the outer ends of which are between the ends of the shoes or intermediate friction members, and the inner ends of which are mounted in the radial slot of the inner clutch member. Each of these levers has on one side a preferably substantially flat surface portion $n$, which extends to the outer ends of the levers and is adapted to engage the end face of one of the friction members $i$. An inner flat side face portion $o$, on the same side of each of the levers and near the inner ends thereof, is adapted to engage the side wall of the slot $f$ of the inner clutch member and operatively connect such inner clutch member with the friction members or shoes. Each of the levers is provided with a lateral lug $p$ adjacent to the outer face portion $q$ of the inner clutch member for preventing the levers from moving too far inward or toward the center of the clutch. The opposite side of each of the levers $m$ is convex or curved forming curved outer end or side surface portions $r$ and curved inner end or side surface portions $s$ on the same side of each lever for engaging the inner clutch member. A circular retaining disk or washer $t$ is provided having a large axial opening which encircles the outer end portion $u$ of the inner clutch member and engages an annular shoulder portion $v$, being held in place by means of the cotter pin $e$, already described, which may also serve to hold the inner clutch member in engagement with the shaft. Either the outer or the inner clutch member may be connected so as to rotate with the shaft, and any desired known means may be employed for forming such connection, in lieu of the cotter pin. As here shown the inner clutch member rotates with the shaft, and the outer main clutch member is rotatable with relation to the inner clutch member and shaft when not secured or connected with such elements by the lever and shoe mechanism above described.

The outer clutch member is provided with a hub portion $w$ upon which suitable driving or driven mechanism such as a crank, lever, gear or pulley or other desired form of gearing may be mounted. The outwardly projecting hub portion $u$ of the inner clutch member is adapted to permit either suitable driving or driven mechanism to be mounted upon or operatively connected with such clutch member. When desirable, the shaft $c$ is adapted to have a lever or crank secured thereto so that a step by step or reciprocating motion of such crank and shaft may produce a continuous rotary motion of the outer clutch member and a continuous movement of the mechanism to be driven thereby, the engagement and release of the parts being silent and positive and practically without lost motion, and the release being instantaneous and without any perceptible adhesion or "sticking" and consequent loss of power.

The levers are at all times in actual contact with the friction shoes and with the inner clutch member, and, during the movement of the parts to securing or connected position, are fulcrumed upon the shoe mechanism. When in connected position the outer clutch member and shoe mechanism hold the levers with great rigidity in position to prevent the rotation of the inner clutch member with relation to the shoe mechanism and outer clutch member, and when the parts are in releasing position, the inner clutch member holds the levers with equal rigidity in position to resist the tendency of the friction shoe mechanism to rotate with the outer clutch member. The levers thus hold the friction shoes in releasing position, and yet they are at all times in articulate engagement with such shoes and adapted to move them, with the minimum extent of movement or play between the parts, into securing frictional engagement with the outer rotatable clutch member. Each lever is in actual engagement with a plurality of shoes and each shoe with a plurality of the levers, and each shoe coöperates with the lever mechanism in pressing the other shoe into securing or connecting position. The friction or wearing surface of the shoes is thus so great that the loosening of the parts due to the wearing away of the parts is reduced to a minimum, and,—the levers being fulcrumed directly upon the shoes and inner clutch member,—the efficiency of the mechanism in operation is not materially affected by such wearing away of the parts as does occur.

In operation, the outer portion of each lever is in articulate engagement with and fulcrumed upon the shoe mechanism on opposite sides of the center of the clutch so that the parts are nicely balanced and the strains upon them reduced to a minimum. During the movement of the parts to releasing position and while in such position the inner ends of the levers are fulcrumed upon the inner clutch member, and they are operated by the inner clutch member while so fulcrumed for releasing the shoes from securing engagement and holding them in such released position. The shoes and levers are in constant contact with the outer clutch member, and when the outer member is employed as the driver and the inner member as the driven member, the action of the outer member upon the sides of the shoes in constant contact therewith is communicated to the levers with the desired certainty producing instant securing engagement or connection between the parts.

The clutching and unclutching of the driving and driven members is effected automatically. The rotation of the inner clutch member—for instance—in one direction causes the levers on opposite sides thereof to press the friction shoes outward into securing frictional engagement with the outer clutch member. This engagement takes place automatically or as the result of turning either of the main clutch members in a given direction with relation to the other. Turning the inner clutch member in the opposite direction from that above described, or stopping it, releases the pressure upon the levers, and the shoes are thus automatically released from clutching engagement with the outer clutch member, and the automatic unclutching of the driving and driven members is thus accomplished.

Assuming that the inner clutch member is the one secured to the driving shaft, its rotation in the direction necessary to bring the driving and driven members into clutching position results in the fulcrum points of the levers being at their extreme outer ends where they engage the shoes at the greatest distance from the center of the device—the power being applied to the levers where they engage the inner clutch member, and the weight point being between the power and fulcrum, or at the point where the convex face of the lever engages the inner corner of the shoe to press it outward. When the driving shaft or shaft upon which the inner clutch member is mounted is stopped or rotated in the opposite direction so as to release the outward pressure upon the shoes automatically, it will be noted that the levers still perform an important function—namely, holding the shoes against rotation and in position to permit the rotation of the outer clutch member relatively to the inner one. When the shoes are thus being held in releasing position by the levers the fulcrums of the levers are at or near their inner ends where they are in engagement with the inner clutch member, and the weight point is at their outer ends where they engage the shoes to hold them against rotation, the power being applied at points between the weight and fulcrum.

I claim:

1. A clutch having a pair of relatively rotatable main clutch members, friction shoes movable into and out of securing frictional engagement with one of such main clutch members, and a plurality of levers each in engagement with a plurality of such friction shoes and with the other main clutch member.

2. A clutch having a pair of rotatable clutch members, friction shoes in engagement with one of such main clutch members, and a plurality of levers each having one end operatively connected with one of the main clutch members and having its opposite end portion in engagement with a plurality of such friction shoes.

3. A clutch having a pair of inner and outer rotatable clutch members, shoe mechanism movable into and out of securing engagement with one of such rotatable clutch members, and levers having their inner end portions in engagement with the inner clutch member and their outer portions fulcrumed upon the shoe mechanism laterally of the inner clutch member and on opposite sides thereof.

4. A clutch having a pair of relatively rotatable clutch members, lever mechanism for connecting such clutch members and permitting the release thereof, and means for forming fulcrums for such lever mechanism at different points successively.

5. A clutch having rotatable clutch members, levers for connecting and releasing such clutch members, and means for forming fulcrums for each of such levers at different points longitudinally thereof.

6. A clutch having inner and outer rotatable clutch members, shoe mechanism movable into and out of securing engagement with one of such rotatable clutch members, and levers in engagement with the other rotatable clutch member and with the shoe mechanism on opposite sides of the central portion of the clutch.

7. A clutch having a pair of rotatable clutch members, shoes movable into and out of securing engagement with one of such clutch members, and levers having their inner end portions in operative engagement with the inner one of such rotatable clutch members and their outer ends in engagement with such shoe mechanism on opposite sides of the central portion of the clutch.

SEVERIN C. ANKER-HOLTH.

Witnesses:
RUFUS COPE,
J. C. KING.